United States Patent [19]

Satama

[11] 3,729,854
[45] May 1, 1973

[54] LURE RELEASING DEVICE

[76] Inventor: Kauko K. Satama, Post Office Box 1222, Apache Junction, Ariz. 85220

[22] Filed: May 10, 1971

[21] Appl. No.: 141,834

[52] U.S. Cl. ................................................. 43/17.2
[51] Int. Cl. ............................................. A01k 97/00
[58] Field of Search .................................... 43/17.2, 5

[56] References Cited

UNITED STATES PATENTS

| | | |
|---|---|---|
| 2,807,905 | 10/1957 | Ford ..................................... 43/17.2 |
| 3,570,163 | 3/1971 | Conder ................................. 43/17.2 |
| 2,764,833 | 10/1956 | Clark .................................... 43/17.2 |
| 1,982,132 | 11/1934 | Boles ....................................... 43/5 |

FOREIGN PATENTS OR APPLICATIONS

| | | |
|---|---|---|
| 1,128,638 | 9/1968 | Great Britain ........................ 43/17.2 |

Primary Examiner—Louis G. Mancene
Assistant Examiner—Daniel J. Leach
Attorney—Warren F. B. Lindsley

[57] ABSTRACT

A lure releasing mechanism for use with fishing tackle employing a weighted member having a retrieving line attachment means at one end and a plate extending laterally from the weighted member at the other end. A plurality of chains are suspended from the plate with each chain provided with a hook. The plate has a slot for receiving the fishing line and includes means for detachably holding the fishing line therein. The mechanism is lowered along the fishing line to a snagged lure whereby a hook grabs the lure and disengages it from the obstacle when a pull is imposed on the retrieving line.

6 Claims, 6 Drawing Figures

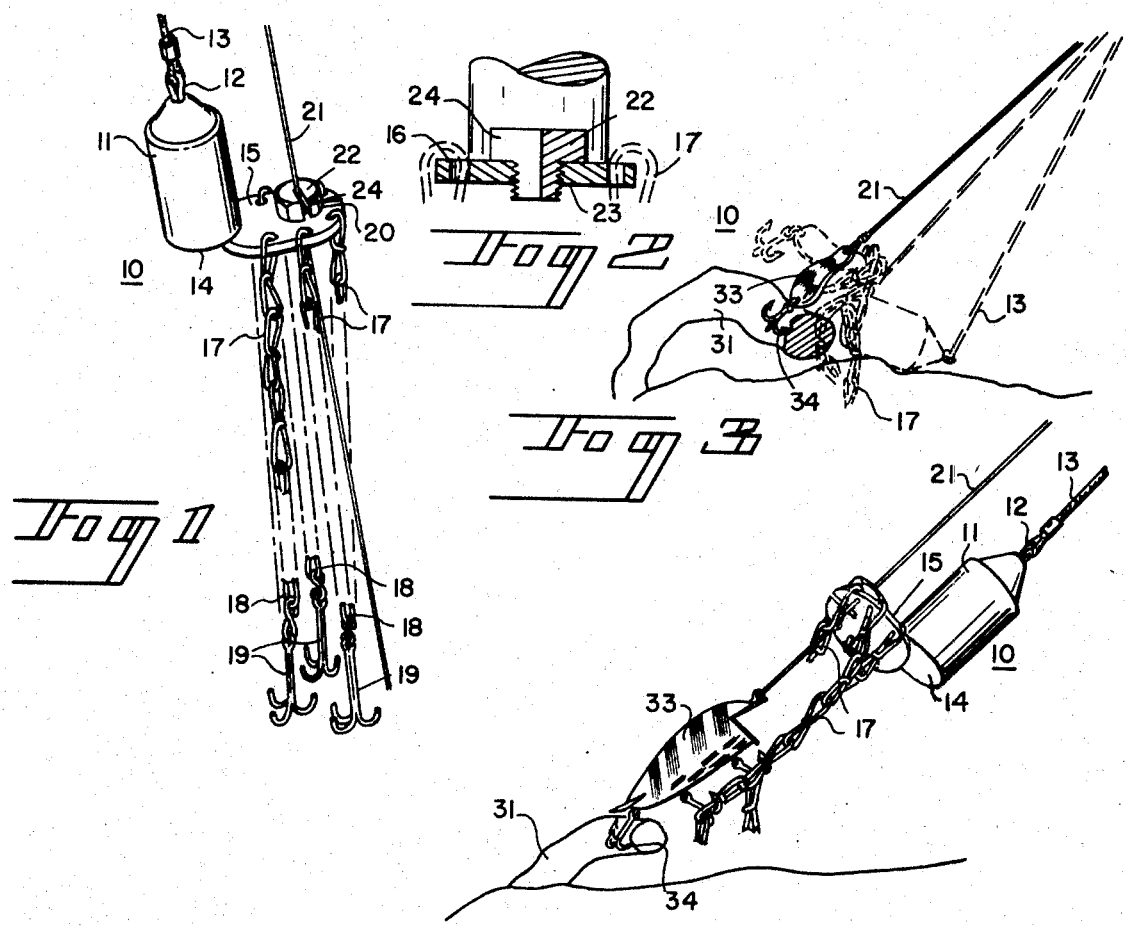
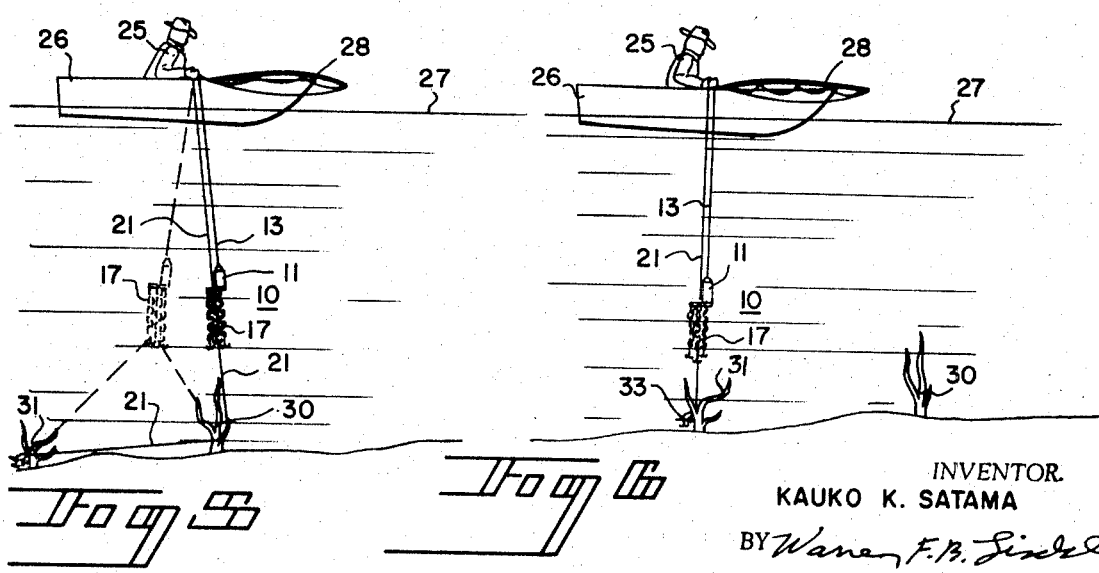

LURE RELEASING DEVICE

BACKGROUND OF THE INVENTION

This invention relates to lure releasing mechanisms for use with fishing tackle.

FIELD OF THE INVENTION

This invention is directed to a lure releasing mechanism for use with fishing tackle employing a plurality of hooks suspended from a sinker which is releasable attached to the fishing line to sink to the lure and capture and retrieve it.

DESCRIPTION OF THE PRIOR ART

Heretofore devices have been provided for releasing sinkers from a fishing line after a fish has been caught and the fisherman desires the pleasure of playing the fish without the weight and encumbrance of the sinker. However, when a line was caught under water and held tight it was difficult, if not impossible, to retrieve the lure without the danger of breaking the fishing line.

SUMMARY OF THE INVENTION

In accordance with the invention claimed a new and improved lure releasing and retrieving device is provided for the fishing enthusiast.

It is, therefore, one object of this invention to provide a new and improved lure releasing and retrieving device.

Another object of this invention is to provide an improved underwater object retriever fastened to a surface held line.

A further object of this invention is to provide a lure releasing and retrieving device which is releasable attached to a fishing line to sink to the lure, capture it and retrieve it by a pull exerted on the device's above water hand held line.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which:

FIG. 1 is a perspective view of a fishing lure releasing and retrieving device as detachable mounted on a fishing line and embodying the invention;

FIG. 2 is an enlarged cross sectional view of the line locking and releasing means shown in FIG. 1;

FIG. 3 is an enlarged view of the fishing lure releasing and retrieving device after it has captured a snagged lure;

FIG. 4 is an enlarged view of the fishing lure releasing and retrieving device of FIG. 3 during the start of the retrieving action;

FIG. 5 illustrates a fisherman lowering the lure releasing and retrieving device to the first snag of a double snagged line and retrieving the line between the two snags before the lure retrieving action; and FIG. 6 illustrates the second step of the double snag retrieving action.

DESCRIPTION OF THE PREFERRED EMBODIMENT

Referring more particularly to the drawing by characters of reference, FIG. 1 discloses a fishing lure releasing and retrieving device 10 comprising a weight 11 in the form of a cylindrical dome shaped member having an eyelet 12 at the top for attachment to a retrieving line 13. Suitably attached to the bottom 14 of weight 11 such as by soldering or welding is a plate 15 extending laterally thereof having a plurality of apertures 16 spacedly arranged around its periphery, each receiving the end link of a chain 17. Adjacent pairs of apertures are arranged to receive different ends of the same chain. At the end 18 of each chain is attached a three-prong hook 19. If so desired the shank of the hook structure is solid to avoid catching on underwater objects, the fishing line or snagging other hooks of device 10. Further, the barbs of the hooks may be removed to further prevent an unnecessary snagging or cutting of the fishing line.

As shown in FIGS. 1 and 2, plate 15 is provided with a slot 20 extending inwardly of its peripheral edge for detachably receiving a fishing line 21.

Plate 15 is further provided with a bolt 22 threadedly attached to plate 15 through an aperture 23 which is intersected by slot 20. Bolt 22 is further provided with a slot 24 arranged longitudinally thereof so that when it is rotated to a given position its slot 24 lines up with slot 20 in plate 15. Thus, line 21 can be moved into aligned slots 20 and 24 and then bolt 22 rotated by hand to capture line 21 in plate 15, as shown in FIG. 1, but at the same time permitting the line 21 to freely move through plate 15 and bolt 22.

Slot 20 is so positioned in plate 15 that bolt 22 is turned tightly into engagement with plate 15 when it is positioned as shown in FIG. 1 in line capturing position.

OPERATION

When a fisherman 25 sitting in a boat 26 on a water surface 27 has snagged his line 21, as shown in FIG. 5, he places device 10 around the line extending from the end of his fishing pole 28 and turns bolt 22 to capture line 21 in device 10. He then lowers device 10 into the water while retaining a hold on the retrieving line 13. Device 10 drops down along line 21 with chains 17 and hooks 19 extending downwardly of device 10, as shown. The hooks when arriving at the obstacle 30 snag line 21 and when device 10 is retrieved it will either pull line 21 free of obstacle 30 or will take hold of line 21 between obstacle 30 and obstacle 31 and pull it up to the fisherman at the surface of the water.

The fisherman, during this action, must release enough fishing line 21 so that he has enough slack to accomplish the action described.

When the fisherman has the portion of the line extending between obstacles 30 and 31 in his hands, he holds this portion, removes device 10 from the fishing line and replaces it again on that portion of the fishing line extending between the fisherman and obstacle 31 as shown in FIG. 6. Device 10 is then lowered to obstacle 31 to capture and retrieve lure 33. In this instance hooks of device 10, when reaching the lure, surround it and at least one or more of hooks 19 grab the lure or hook 34 of lure 33 or the hooks 34 of lure 33 engage in the eyelets of chains 17.

In order to aid in the retrieving action of device 10 with lure 33, weight 11 is mounted at one edge of plate 15 so that the weight will rotate plate 15 about its point of attachment to the fishing line to assure the lure snagging action of chain 17 and hooks 19, as shown in FIG. 3.

FIG. 4 shows the lure having some of its hooks 34 entangled in the loops or eyelets of one or more of chains 17. By a strong tug on line 13 of device 10 the lure can be pulled free of its entanglement with obstacle 31 and retrieved.

It should be recognized that if the fisherman uses clamped or pinched on lead sinkers above the hooks or lures the disclosed retrieving device 10 will drive down the pinched lead sinkers to the hooks or lures by its weight, thereby making it easy for device 10 to grab hold of the hooks or lures.

Although but one embodiment of the present invention has been illustrated and described, it will be apparent to those skilled in the art that various changes and modifications may be made therein without departing from the spirit of the invention or from the scope of the appended claims.

I claim:

1. A fishing lure releasing and retrieving device comprising in combination:

a weighted member having a retrieving line attachment means at one end and a plate extending laterally from one side thereof at the other end, at least one chain attached to said plate and arranged to hang downwardly therefrom off-center from said plate, said chain being provided with at least one hook arranged to extend downwardly from said chain, said plate being provided with a slot extending inwardly of its peripheral edge for loosely receiving a fishing line, said slot guiding said fishing line to a position spaced from said weighted member, means for detachably holding the fishing line in said slot without restricting its movement longitudinally through said slot, said device when attached to a snagged fishing line sinks along the fishing line to the obstacle entangling with the lure, and said weighted member pivoting under the weight of gravity about the fishing line, whereby the lure is disengaged from the obstacle when a pull is exerted on a retrieving line attached to said retrieving line attachment means.

2. The fishing lure releasing and retrieving device set forth in claim 1 wherein:

a plurality of chains are loosely attached to said plate and arranged to extend downwardly therefrom, and said chains each being provided with a hook means at its lower end.

3. The fishing lure releasing and retrieving means set forth in claim 1 wherein:

said plate is provided with a plurality of apertures around at least a part of its periphery, a plurality of chains, each having an end extending through a different aperture for loosely connecting to said plate, and each of said chains being provided with a hook loosely attached thereto to extend from the lower end thereof.

4. The fishing lure releasing and attachment means set forth in claim 1 wherein said means for detachably holding the fishing line in said slot comprises a bolt threadedly connected to said plate, said bolt being slotted longitudinally thereof and when rotated to a given position causing said slot in said bolt to align with said slot in said plate to receive the fishing line and when rotated to a further position capturing the fishing line so that it may pass longitudinally through said bolt but kept from moving out of said slot in said plate.

5. The fishing lure releasing and retrieving means of claim 1 wherein said weighted member is of a cylindrical configuration of relatively more weight than the weight of said plate, thereby causing said member to rotate about said plate when it reaches an obstacle in the water.

6. The fishing lure releasing and retrieving means of claim 2 wherein said hooks are barbless.

* * * * *